No. 733,065. Patented July 7, 1903.

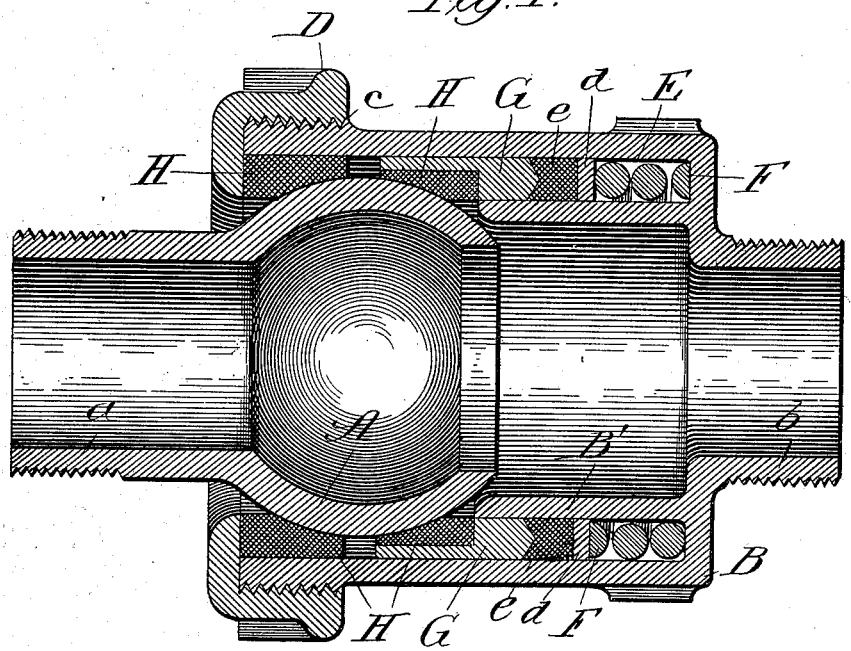

UNITED STATES PATENT OFFICE.

JESSE C. MARTIN, JR., OF SAN FRANCISCO, CALIFORNIA.

FLEXIBLE PIPE-JOINT.

SPECIFICATION forming part of Letters Patent No. 733,065, dated July 7, 1903.

Application filed February 26, 1903. Serial No. 145,190. (No model.)

*To all whom it may concern:*

Be it known that I, JESSE C. MARTIN, Jr., a citizen of the United States, residing at San Francisco, in the county of San Francisco and State of California, have invented a new and useful Improvement in Flexible Pipe-Joints, of which the following is a specification.

My invention relates to an improvement in the class of flexible pipe-joints in which a spring is employed for the purpose of pressing the joint-sections together.

The primary object of my improvement is to provide a construction of the flexible joint whereby the spring within it shall be effectually shielded against the access to it of oil, water, or other liquid, for conducting which the pipes connected by the joint shall be used.

To this end my invention consists in the general construction of flexible pipe-joint whereby my aforesaid object is accomplished; and it also consists in the details of construction and combinations of parts hereinafter set forth, and pointed out in the claims.

In the accompanying drawings, Figure 1 is a central longitudinal section of a ball-and-socket pipe-joint constructed in accordance with my improvement, and Fig. 2 is a similar view of another form of pipe-joint containing my improvement.

Referring particularly to Fig. 1, A is the ball portion, terminating in an externally-threaded nipple $a$, and B is the socket portion, terminating at one end in the externally-threaded nipple $b$ and provided at its opposite end with an external thread $c$, upon which to screw the annular cap D. The socket B is cast or otherwise formed with an internal annular wall B', extending inward from about the nipple $b$ and forming a spring-chamber E. Within the chamber E is housed a coiled spring F, confined at one end by a washer $d$ with soft packing $e$ confined against it by a follower G, having a bearing edge of V shape in cross-section to meet the center of the ring of packing E and tend to spread it in opposite directions therefrom against the adjacent surfaces of the annular wall B' and outer wall of the casing. As shown, the ball is surrounded by an annular gasket H, formed in two sections, confined within the casing, with the cap D bearing against the end of the outermost section.

By the construction thus described the spring F is effectually shielded from access to it of fluid passing through the joint, and therefore from the deleterious effect thereof due to the tendency of such fluid to injure the spring by impairing its temper, rusting it, and the like.

The construction illustrated in Fig. 2 presents my improvement in the form of a socket portion B, with the threaded nipple $b$ at one end and external thread $c$ at its opposite end, having a cap D screwed upon it, and the internal wall B', forming the chamber E for the spring F, confined by a washer $d$ and soft packing $e$. The joint-section A' has formed integral with it the annular follower G, provided with the inner edge of V shape in cross-section and forming an offset at $f$, against which a gasket H' is confined by the cap D. The outer end of the section A' is shown externally threaded with an elbow I screwed upon it.

Obviously the effects of the construction presented in Fig. 2 are the same as those described of the construction illustrated in Fig. 1.

What I claim as new, and desire to secure by Letters Patent, is—

1. In combination, a pipe-joint socket-section, a companion section confined in the socket-section, one of said sections having an annular recess the walls of which are integral with said section, a spring in the recess pressing the sections together, and a packing in the recess receiving pressure from said spring to seal the recess.

2. In combination, a pipe-joint socket-section having an annular recess the walls of which are integral with said section, a companion section confined in the socket-section, a spring in the recess, a follower receiving pressure from the spring to press the sections together, and a packing in the recess between the spring and follower to seal the recess.

3. In combination, a pipe-joint socket-section having an annular recess the walls of which are integral with said section, a companion section confined in the socket-section, a spring in the recess, a follower having a V-shaped end entering the recess said follower receiving pressure from the spring to press the sections together, and a packing in the recess between the V-shaped end of the follower and spring to seal the recess.

4. A ball-and-socket pipe-joint comprising, in combination, a socket portion provided with an internal annular wall forming a spring-chamber, a spring confined in said chamber, a washer confined against said spring, packing confined against said washer, a follower having a bearing edge of V shape in cross-section bearing against said packing, the ball portion confined in said socket and surrounded therein by a gasket, and a cap screwed on said socket portion.

JESSE C. MARTIN, JR.

In presence of—
  L. HEISLAR,
  WALTER WINBERG.